United States Patent
Arora et al.

(10) Patent No.: US 9,838,214 B2
(45) Date of Patent: Dec. 5, 2017

(54) WI-FI OFFLOAD OF CELLULAR DATA

(71) Applicant: Oracle International Corporation, Redwood Shores, CA (US)

(72) Inventors: Jitender Arora, Nashua, NH (US); Cheng Liu, Acton, MA (US); Balaji Thoguluva Bapulal, North Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 14/267,285

(22) Filed: May 1, 2014

(65) Prior Publication Data

US 2015/0319091 A1    Nov. 5, 2015

(51) Int. Cl.
*H04L 12/801* (2013.01)
*H04L 12/403* (2006.01)

(52) U.S. Cl.
CPC .................... *H04L 12/403* (2013.01)

(58) Field of Classification Search
CPC ..... H04W 12/08; H04W 36/14; H04W 40/02; H04W 52/0203; H04L 47/12; H04L 47/285; H04L 12/911; H04L 12/801
See application file for complete search history.

(56) References Cited

U.S. PATENT DOCUMENTS

| 8,204,064 | B2 | 6/2012 | MeLampy et al. |
| 8,457,130 | B2 | 6/2013 | Kumar et al. |
| 8,554,142 | B2 | 10/2013 | Hoover et al. |
| 2002/0114323 | A1* | 8/2002 | Chowdhury ........ H04L 12/2856 370/352 |
| 2006/0126565 | A1* | 6/2006 | Shaheen ........... H04W 36/0022 370/331 |
| 2006/0209800 | A1* | 9/2006 | Lee .......................... H04L 63/08 370/352 |
| 2013/0077482 | A1 | 3/2013 | Krishna et al. |
| 2013/0097674 | A1* | 4/2013 | Jindal ................. H04L 63/0876 726/4 |
| 2013/0138823 | A1 | 5/2013 | Centemeri et al. |

OTHER PUBLICATIONS

Kyunghan Lee et al.; "Mobile Data Offloading: How Much Can WiFi Deliver?"; ACM CoNEXT 2010, Nov. 30-Dec. 3, 2010, Philadelphia, USA.

* cited by examiner

*Primary Examiner* — Anez Ebrahim

(74) *Attorney, Agent, or Firm* — Miles & Stockbridge P.C.

(57) ABSTRACT

A security gateway system offloads cellular data from user equipment ("UE"). The system receives a dynamic host configuration protocol ("DHCP") message from a Wi-Fi access point ("AP") in communication with the UE. The system converts the DHCP message into an authentication, authorization and accounting ("AAA") access request and sends the AAA access request to an AAA server. The system receives an AAA access accept from the AAA server and initiates a gateway general packet radio service tunneling protocol tunnel setup with a setup node.

19 Claims, 16 Drawing Sheets

WI-FI OFFLOAD OF CELLULAR DATA

FIELD

One embodiment is directed generally to a communication system, and in particular to a communication system for offloading cellular data onto a Wi-Fi network.

BACKGROUND INFORMATION

Mobile data offloading generally refers to the use of complementary network technologies for delivering data originally targeted for cellular networks. Cellular operators perform and encourage offloading to ease congestion of cellular networks. The primary complementary network technologies used for mobile data offloading are Wi-Fi, "femtocells"/"small cells" and Integrated Mobile Broadcast.

An increasing need for offloading solutions is caused by the explosion of Internet data traffic, especially the growing portion of traffic going through mobile networks. This has been enabled by smartphone devices possessing Wi-Fi capabilities together with large screens and different Internet applications, from browsers to video and audio streaming applications. In addition to smartphones, laptops and tablets with 3G/4G access capabilities are also a major source of mobile data traffic. Further, Wi-Fi is typically much less costly to build than cellular networks.

SUMMARY

One embodiment is a security gateway system that offloads cellular data from user equipment ("UE"). The system receives a dynamic host configuration protocol ("DHCP") message from a Wi-Fi access point ("AP") in communication with the UE. The system converts the DHCP message into an authentication, authorization and accounting ("AAA") access request and sends the AAA access request to an AAA server. The system receives an AAA access accept from the AAA server and initiates a gateway general packet radio service tunneling protocol tunnel setup with a setup node.

DETAILED DESCRIPTION

One embodiment is a Wi-Fi offload solution in which a wireless network element processes dynamic host configuration protocol ("DHCP") requests from mobile devices (i.e., user equipment) and interacts with policy servers to authorize access and provide an Internet Protocol ("IP") address to mobile devices.

Figure 1:
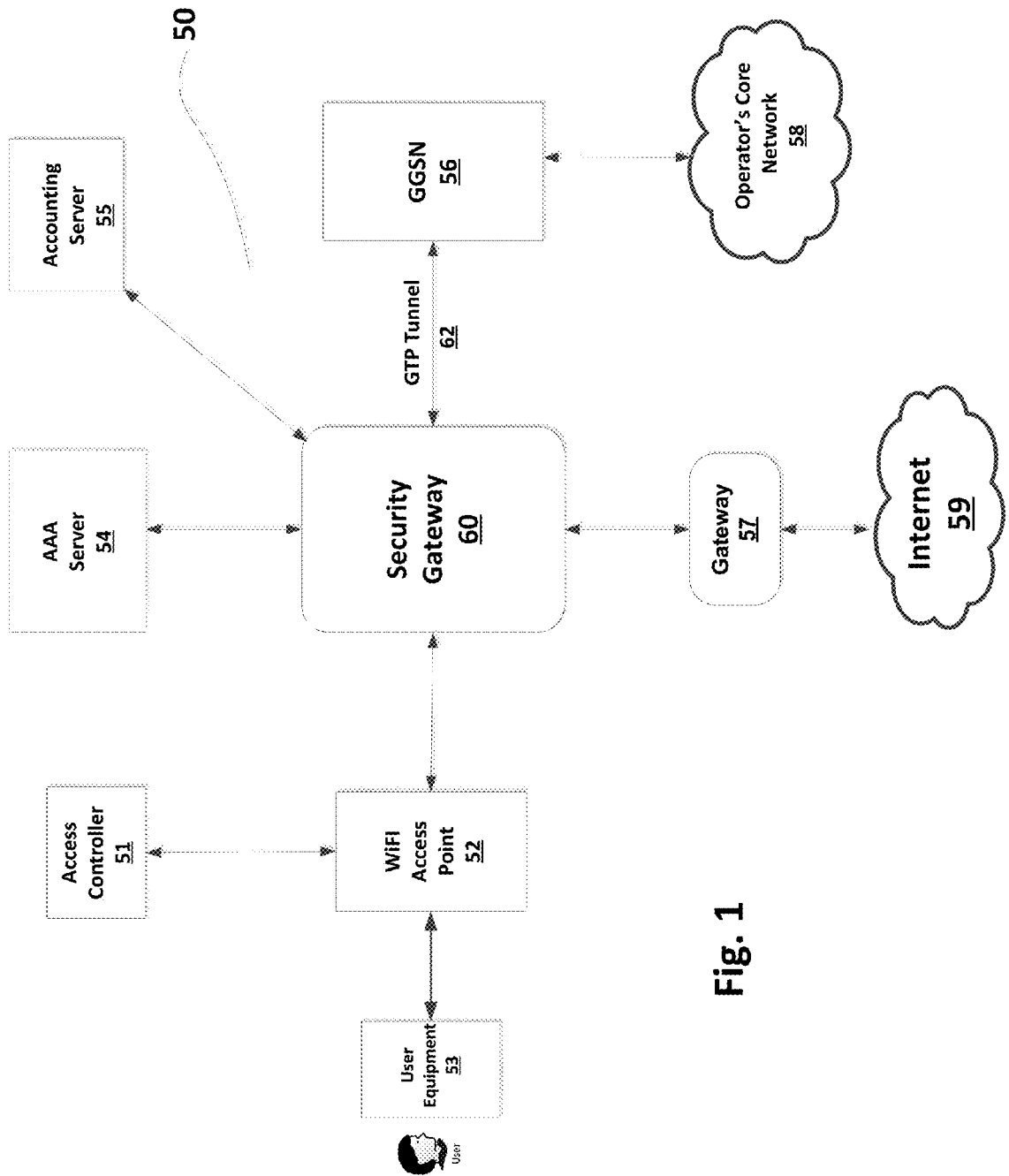
FIG. 1 is an overview diagram of a network including network elements that implement embodiments of the present invention and/or interact with embodiments of the present invention.

FIG. 1 is an overview diagram of a network 50 including network elements that implement embodiments of the present invention and/or interact with embodiments of the present invention. Network 50 includes user equipment ("UE") 53 that is able to connect to a Wi-Fi access point ("AP") 52. UE 53 may be any device used by an end-user for Wi-Fi communication, including a smartphone, a laptop computer, a tablet, etc. UE 53 may be in communication with AP 52 using known methods. AP 52 is coupled to an access controller ("AC") 51.

Network 50 further includes a security gateway 60, also referred to as a "multi-service security gateway" ("MSG"), a "wireless access gateway" ("WAG") or an evolved packet data gateway ("ePDG"), coupled to a "authentication, authorization and accounting" ("AAA") server 54. Security gateway 60 functions, in general, as a high performance tunneling gateway for heterogeneous networks, while AAA server 54 functions, in general, as a security architecture for distributed systems for controlling which users are allowed access to which services, and tracking which resources they have used.

AAA server 54 in embodiments functions in accordance to either Remote Authentication Dial In User Service ("RADIUS" or "Radius") or "Diameter" protocol specifications. Radius is a networking protocol that provides centralized AAA management for users that connect and use a network service. Diameter is an AAA protocol for computer networks that has largely replaced Radius.

Security gateway 60 is further coupled to an accounting server ("AS") 55, and a gateway general packet radio service ("GPRS") support node ("GGSN") 56. Security gateway 60 is in communication with GGSN 56 through a GPRS tunneling protocol ("GTP") tunnel 62.

Security gateway 60 is coupled through a default gateway 57 to the Internet 59. GGSN 56 is coupled to a cellular operator's core network 58. A core network, in general, is the central part of a telecommunication network that provides various services to customers who are connected by the access network. The core network is responsible for handling voice/data traffic over the public switched telephone network ("PSTN"), an IP network, or any other combination of networks.

Figure 2:
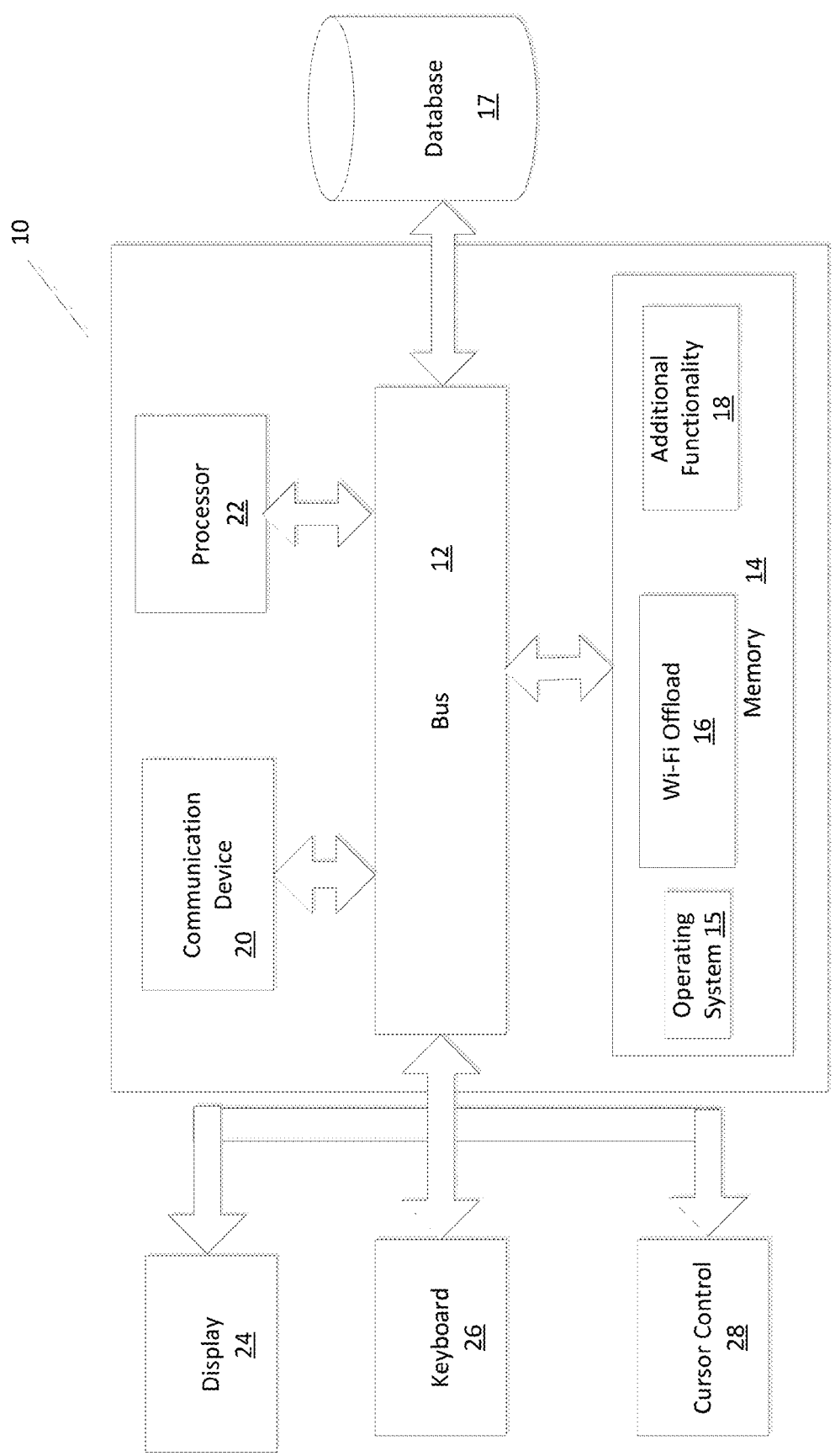
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of user equipment, system 10 may be a smartphone that includes a processor, memory and a display, but may not include one or more of the other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a Wi-Fi offload module 16 for performing Wi-Fi offloading of cellular data, and all other functionality disclosed herein. System 10 can be part of a larger system, such as added functionality to the "Oracle Communications Security Gateway" from Oracle Corp. Therefore, system 10 can include one or more additional functional modules 18 to include the additional functionality. A database 17 is coupled to bus 12 to provide centralized storage for modules 16 and 18.

Wi-Fi Offload Message Flows

Figure 3:
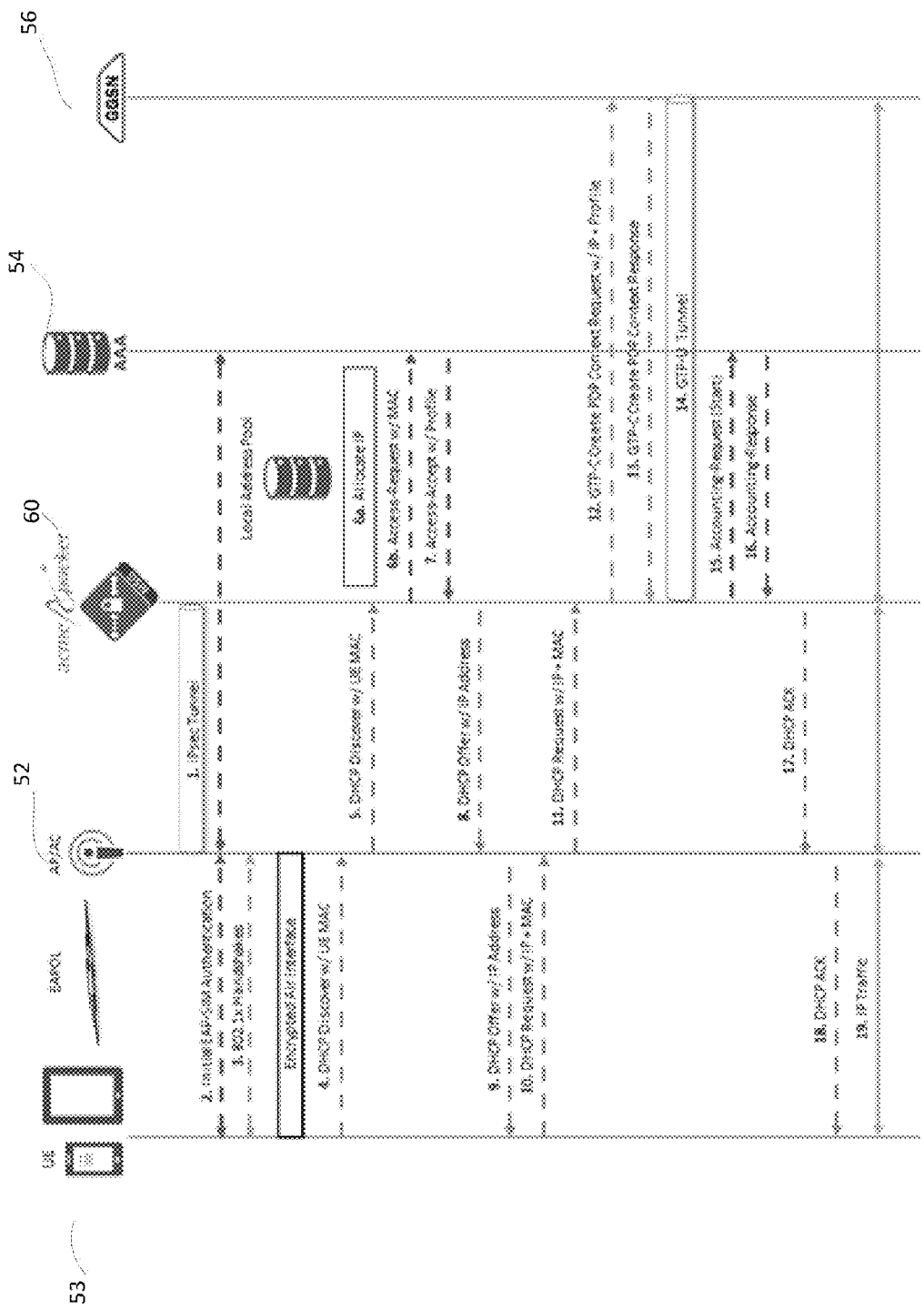
FIG. 3 is a DHCP-based message flow setup when interworking with a GGSN in accordance with one embodiment.

FIGS. 3-15 below, in general, are message flows of IP address assignment and data flow setup using DHCP in accordance with embodiments of the invention. FIG. 3 is a DHCP-based message flow setup when interworking with a GGSN in accordance with one embodiment. The message flow is as follows:

1. An IP security ("IPsec") tunnel is created between AP 52 and SG 60 at the time AP 52 is booted. AP 52 will relay all traffic between UE 53 and SG 60 over the IPsec tunnel. In some embodiments, the IPsec tunnel is an optional feature that is provided when security is desired between AP 52 and SG 60. When the IPsec tunnel is created as needed, all traffic between AP 52 and SG 60 will be protected by IPsec.

2. UE 53 connects to AP 52 over Wi-Fi, and uses Extensible Authentication Protocol ("EAP")-SIM authentication to authenticate with AAA server 54.

3. The 802.1x connection setup completes, and UE 53 is now connected.

4. UE 53 broadcasts a DHCP Discover message in order to receive an IP address. The DHCP message contains the media access control ("MAC") address of the UE in the DHCP "chaddr" field.

TABLE 1

DHCPDISCOVER fields

| DHCP Message Field | (M)andatory, (C)onditonal, (O)ptional | Field Value |
| --- | --- | --- |
| "chaddr" (Client Hardware Address) | M | The UE MAC Address. |
| Client Identifier Option (61) | M | Unique ID for client. May be set to the MAC. |
| Requested Parameter Option (55) | O | Parameters requested of the DHCP server. |

5. AP 52 acts as a BOOTP/DHCP relay server, and relays the DHCP broadcast towards SG 60.

6. SG 60 receives the DHCP Discover message.

a. If the address assignment will be done through a local address pool, SG 60 will assign the UE IP address prior to contacting AAA server 54. Otherwise, AAA server 54 will be responsible for assigning the UE IP address.

b. The DHCP Discover message is converted into an AAA Access-Request, which is sent to AAA server 54.

TABLE 2

Radius Access-Request fields

| Radius Message Field | (M)andatory, (C)onditonal, (O)ptional | Field Value |
| --- | --- | --- |
| User-Name | M | MAC address, taken from DHCP "chaddr" field. |
| Framed-IP-Address | C | The IP address that was allocated for the UE. Present if the MSG allocated the IP. |

7. AAA server 54 receives the Access-Request, and associates the MAC address with UE 53 that is already authenticated over EAP-SIM. If AAA server 54 is responsible for allocating the UE IP address, an IP will be assigned to UE 53. AAA server 54 retrieves the GPRS profile information for UE 53, and responds with an Access-Accept message.

TABLE 3

Radius Access-Accept fields

| Radius Message Field | (M)andatory (O)ptional (C)onditonal | Field Value |
|---|---|---|
| Framed-IP-Address | C | Only required in the case that the AAA server allocates the IP address. The IP address that was allocated for the UE. |
| Framed-IP-Netmask | O | The subnet mask for the UE. |
| 3GPP-IMSI | M | The UE IMSI |
| 3GPP-WLAN-APN-Id | M | The APN |
| Chargeable-User-Identity | M | The MSISDN |
| 3GPP-NSAPI | O | The NSAPI |
| 3GPP GPRS QoS Profile | O | The QoS Profile. |
| Accounting-Interim-Interval | O | Interval at which to send interim accounting records. |
| Session-Timeout | O | Session-Timeout interval. Used to determine DHCP lease timers. |

8. SG 60 receives the Access-Accept, and generates a DHCP Offer with the IP address that was allocated to UE 53. The profile information is stored in SG 60 to be used when later setting up the GTP tunnel.

TABLE 4

DHCPOFFER fields

| DHCP Message Field | (M)andatory (O)ptional (C)onditonal | Field Value |
|---|---|---|
| "yiaddr" (Your IP Address) | M | The IP address that was allocated for the UE |
| "siaddr" (Server IP Address) | M | The DHCP Server IP address on the MSG |
| "chaddr" (Client Hardware Address) | M | The UE MAC Address |
| Subnet Mask Option (1) | M | Taken from Framed-IP-Netmask if present, or local configuration. |
| Router Option (3) | M | The default gateway/router |
| Domain Name Server Option (6) | M | DNS server address, configured. |
| DHCP Server ID Option (54) | M | The DHCP Server IP address on the MSG |
| DHCP Lease Time Option (51) | M | From AAA Session-Timeout, or local config. |
| DHCP Renewal Time Option (58) | O | Set to ½ of Lease Time, or configurable. |
| DHCP Rebinding Time Option (59) | O | Set to 87.5% of Lease Time, or configurable. |

9. AP 52 receives the DHCP Offer, and relays it back to UE 53.

10. UE 53 wishes to accept the DHCP Offer, and sends a DHCP Request message.

TABLE 5

DHCPREQUEST fields

| DHCP Message Field | (M)andatory, (C)onditonal, (O)ptional | Field Value |
|---|---|---|
| "chaddr" (Client Hardware Address) | M | The UE MAC Address |
| Requested IP Address Option (50) | M | The Requested IP Address. |
| Requested Parameter Option (55) | O | Parameters requested of the DHCP server. |

11. AP 52 receives the DHCP Request, and relays it to SG 60.

12. SG 60 receives the DHCP Request, and validates that the requested IP address matches the one offered. SG 60 determines that the policy for UE 53 is to route to GGSN 56. SG 60 then initiates the GTP tunnel setup with GGSN 56 by sending a Create-PDP-Context Request to GGSN 56.

TABLE 6

Create-PDP-Context-Request fields

| GTP-C Message Field | (M)andatory, (C)onditonal, (O)ptional | Field Value |
|---|---|---|
| IMSI | M | 3GPP-IMSI from AAA Access-Accept. |
| NSAPI | M | From AAA 3GPP-NSAPI, or local configuration. |
| End user address | M | The UE IP address that was allocated. |
| Access Point Name | M | From AAA 3GPP-WLAN-APN-Id. |
| QoS | M | From AAA 3GPP GPRS QoS Profile, or local configuration. |

13. GGSN 56 responds with a Create-PDP-Context Response.

14. The GTP-U tunnel is now established. SG 60 programs the flows between the GTP-U tunnel and the IPsec tunnel, if it was previously determined that the IPsec tunnel was needed for security and was previously created.

15. SG 60 sends an Accounting-Request (Start) to AAA server 54.

TABLE 7

Accounting-Request (Start) fields

| Radius Message Field | (M)andatory, (C)onditonal, (O)ptional | Field Value |
|---|---|---|
| Calling-Station-ID | M | The MSISDN, taken from Chargeable-User-Identity of Access-Accept |
| Framed-IP-Address | M | The UE IP address |
| Acct-Session-Id | M | Generated by the MSG. |
| Acct-Status-Type | M | Start |

16. AAA Server 54 responds with an Accounting-Response, acknowledging the request.

17. SG 60 responds to the DHCP Request with a DHCP ACK message. This confirms that the IP address was successfully allocated to UE 53 for use.

18. AP 52 relays the DHCP ACK back to UE 53.

19. UE 53 sends and receives data using the allocated IP address. AP 52 manages routing the traffic to and from SG 60, and SG 60 will route the traffic to and from GGSN 56 over the GTP-U tunnel.

Figure 4:
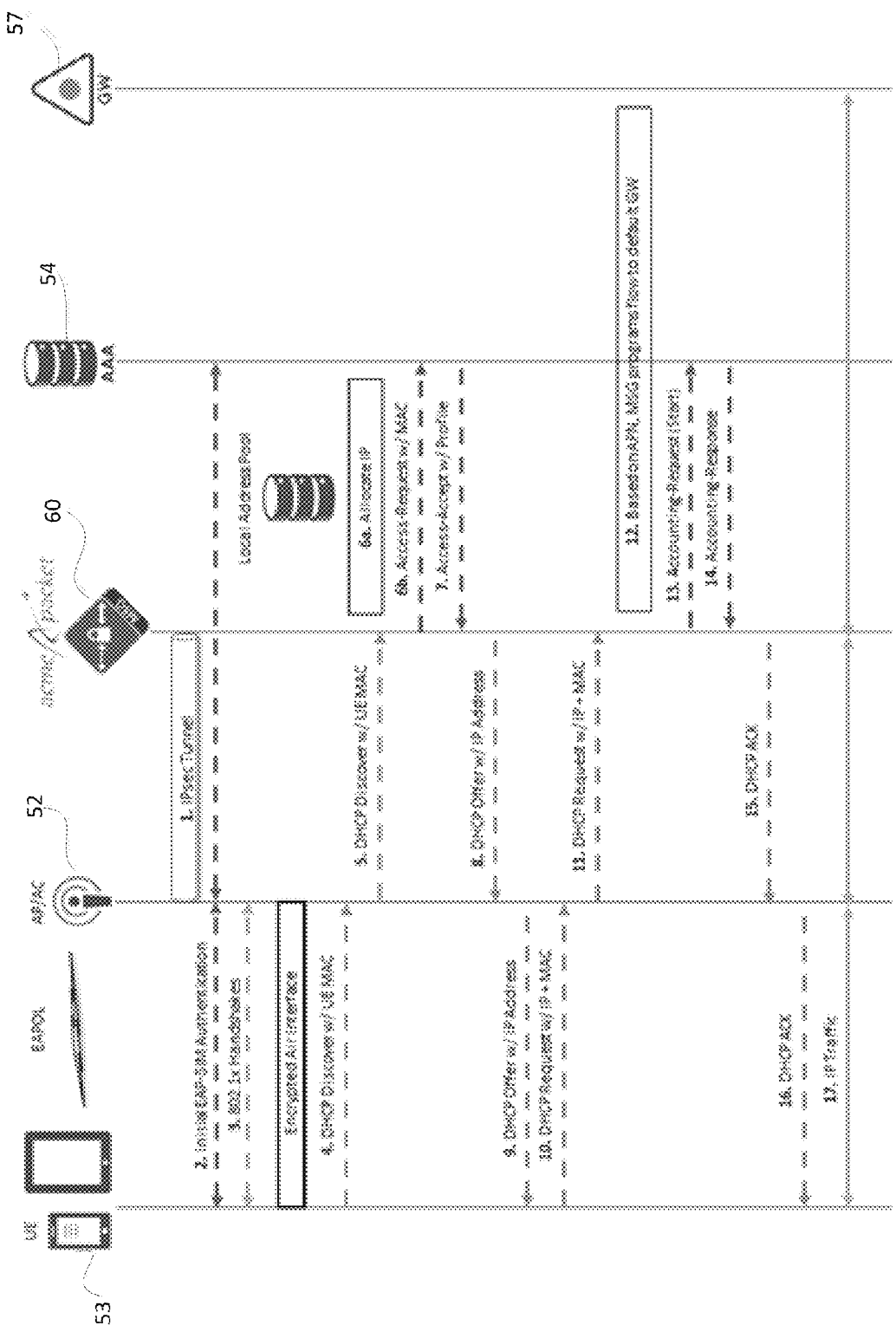
FIG. 4 is a DHCP-based message flow setup when interworking with a default gateway, such as a default gateway, in accordance with one embodiment.

FIG. 4 is a DHCP-based message flow setup when interworking with a default gateway, such as default gateway 57, in accordance with one embodiment. The signaling flows when routing to default gateway 57 are identical to those of FIG. 3 except the Gn' interface has been removed. Further, in FIG. 4, flows 12-14 of FIG. 3 replaced with the following flow:

12. Based on the UE profile information received from AAA server 54 (i.e., access point name ("APN")), SG 60 determines that the policy is to route the UE traffic to default gateway 57 instead of GGSN 56 of FIG. 3.

Figure 5:
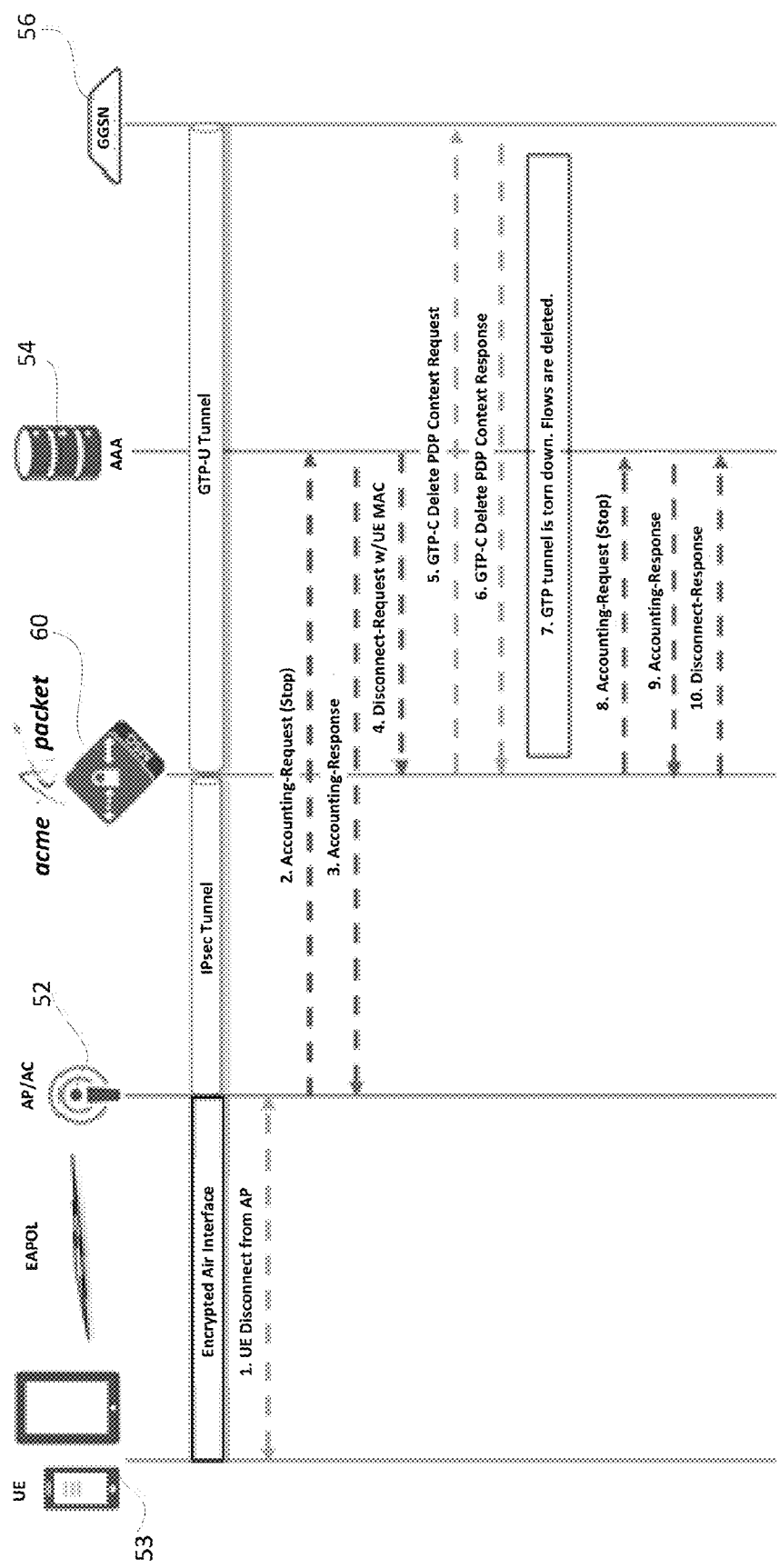
FIG. 5 is a UE initiated DHCP-based teardown message flow when interworking with a GGSN in accordance with one embodiment.

FIG. 5 is a UE initiated DHCP-based teardown message flow when interworking with a GGSN in accordance with one embodiment. The message flow is as follows:

1. UE 53 disconnects from the AP Wi-Fi connection.
2. AP 52 sends an Accounting-Request (Stop) to AAA server 54.
3. AAA server 54 responds back to the Accounting-Request.
4. AAA server 54 associates the accounting stop from AP 52 with the accounting session on SG 60, and generates a Radius Disconnect-Request message to SG 60, with the UE MAC address in the User-Name field.
5. SG 60 initiates GTP tunnel teardown by sending a Delete-PDP-Context request to GGSN 56.
6. GGSN 56 responds back with a Delete-PDP-Context response.
7. SG 60 removes all flow information for GTP and DHCP, and cleans up any active contexts.
8. SG 60 sends an Accounting-Request (Stop) to AAA server 54.

TABLE 8

Account-Request (Stop) fields

| Radius Message Field | (M)andatory, (C)onditonal, (O)ptional | Field Value |
|---|---|---|
| Calling-Station-ID | M | The MSISDN, taken from Calling-Station-ID of Access-Accept |
| Framed-IP-Address | M | The UE IP address |
| Acct-Session-Id | M | Same as in the Start Request |
| Acct-Status-Type | M | Stop |
| Acct-Input-Octets | M | # Octets in to the UE |
| Acct-Output-Octets | M | # Octets out of the UE |
| Acct-Input-Packets | M | # Packets in to the UE |
| Acct-Output-Octets | M | # Packets out of the UE |

9. AAA server 54 will release the IP address if allocated, and collect any accounting information. AAA server 54 then sends an Accounting-Response (Stop) back to SG 60.
10. SG 60 responds to the Disconnect-Request with a Disconnect-ACK, signaling that all contexts have been cleared.

In another embodiment, a UE initiated DHCP-based teardown message flow is performed with a default gateway, such as default gateway 57, instead of interworking with a GGSN as in FIG. 5. In this embodiment, the message flow is identical to FIG. 5 except flows 5 and 6 are removed.

Figure 6:
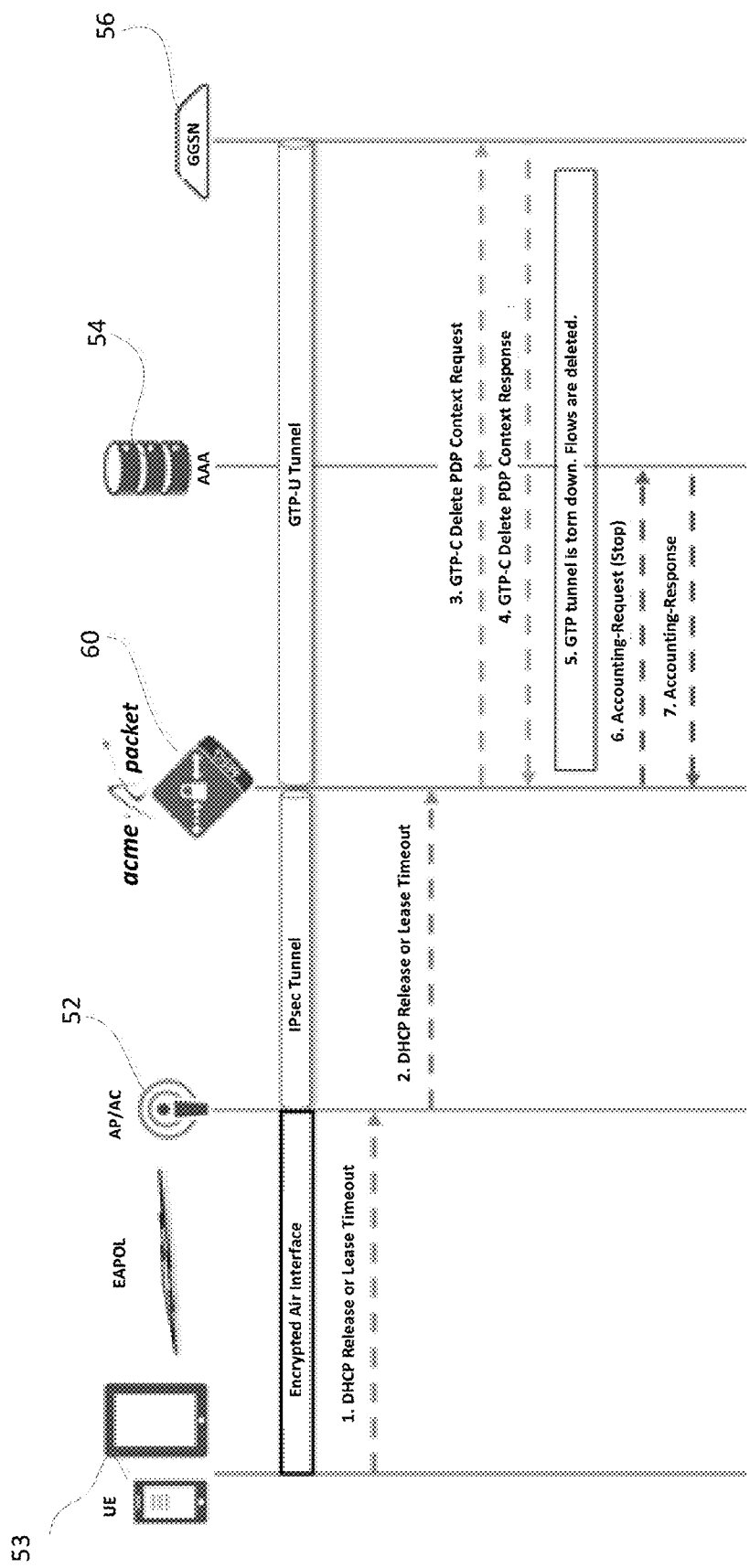
FIG. 6 is a DHCP-based initiated release or timeout message flow when interworking with a GGSN in accordance with one embodiment.

FIG. 6 is a DHCP-based initiated release or timeout message flow when interworking with a GGSN in accordance with one embodiment. The message flow is as follows:

1. UE 53 may send a DHCP Release message to release the IP address that was allocated. The procedure would be the same as if the DHCP lease or other internal timers expire, so both procedures are covered in this example.
2. AP 52 relays the DHCP Release over the IPsec tunnel. As previously discussed, the IPsec tunnel is optional. If the IPsec tunnel was established during the offload initiation procedure, then the DHCP Release will be sent over the IPsec tunnel. Otherwise, it will be sent without using the IPsec tunnel.
3. SG 60 receives the DHCP Release, or an internal SG timer expires. SG 60 initiates GTP tunnel teardown by sending a Delete-PDP-Context request to GGSN 56.
4. GGSN 56 responds back with a Delete-PDP-Context response.
5. SG 60 removes all flow information for GTP and DHCP, and cleans up any active contexts.
6. SG 60 sends an Accounting-Request (Stop) to AAA server 54 (see Table 8 above).
7. AAA server 54 will release the IP address if allocated, and collect any accounting information. AAA server 54 then sends an Accounting-Response (Stop) back to SG 60.

In another embodiment, a DHCP-based initiated release or timeout message flow is performed with a default gateway, such as default gateway 57, instead of interworking with a GGSN as in FIG. 6. In this embodiment, the message flow is identical to FIG. 6 except flows 3 and 4 are removed.

Figure 7:
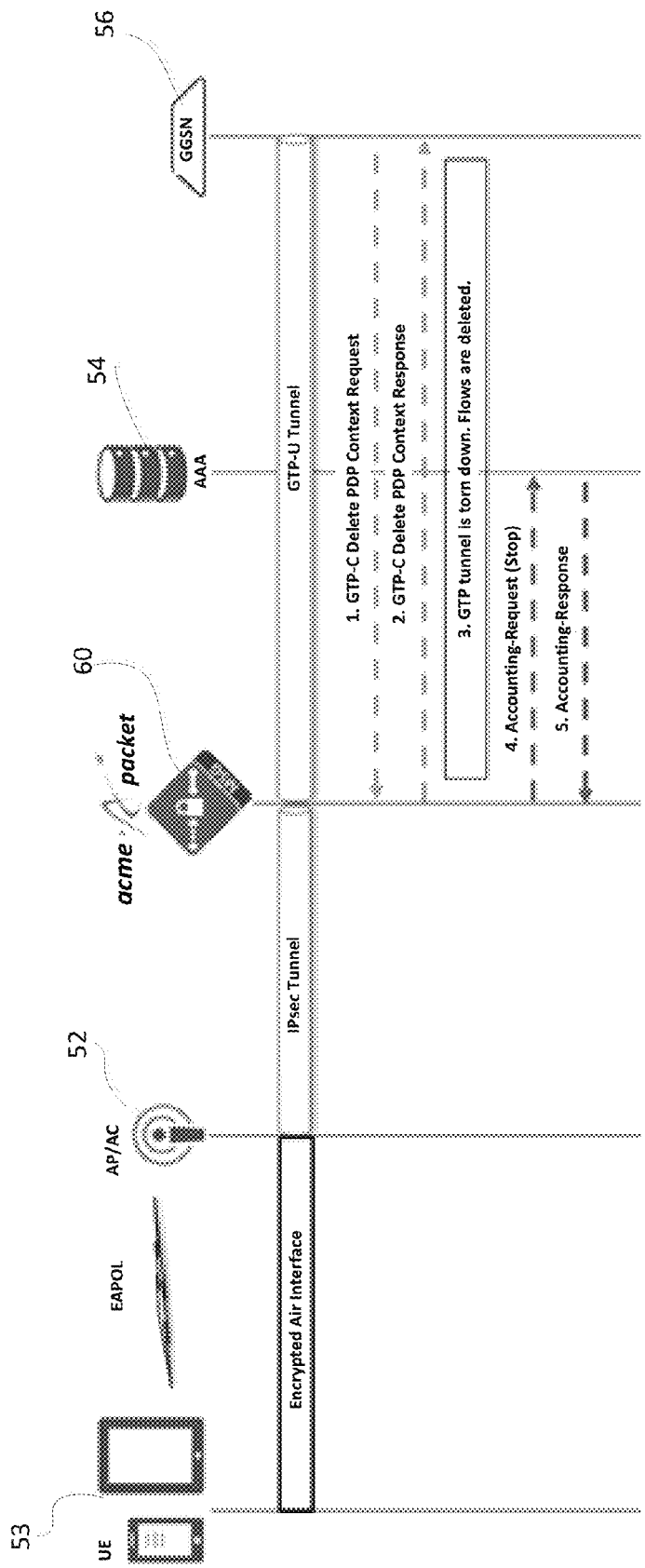
FIG. 7 is a DHCP-based GGSN initiated teardown message flow in accordance with one embodiment.

FIG. 7 is a DHCP-based GGSN initiated teardown message flow in accordance with one embodiment. The message flow is as follows:

1. GGSN 56 initiates GTP tunnel teardown by sending a Delete-PDP-Context request to SG 60.
2. SG 60 responds back with a Delete-PDP-Context response.
3. SG 60 removes all flow information for GTP and DHCP, and cleans up any active contexts.
4. SG 60 sends an Accounting-Request (Stop) to AAA server 54 (see Table 8 above).
5. AAA server 54 will release the IP address if allocated, and collect any accounting information. AAA server 54 then sends an Accounting-Response (Stop) back to SG 60.

Embodiments shown in FIGS. 8-10 below are Internet Key Exchange version 2, under RFC 4306 ("IKE")-based message flows. These message flows are based on the tunnel terminating gateway ("TTG") functionality defined in Annex F of 3GPP TS 23.234 V11.0.0 Release 11 3GPP, "System to Wireless Local Area Network (WLAN) interworking", the disclosure of which is hereby incorporated by reference. In the embodiments, there is an IPsec tunnel from each UE to the SG. The IKE exchanges are consolidated into Request and Response messages for clarity.

Figure 8:
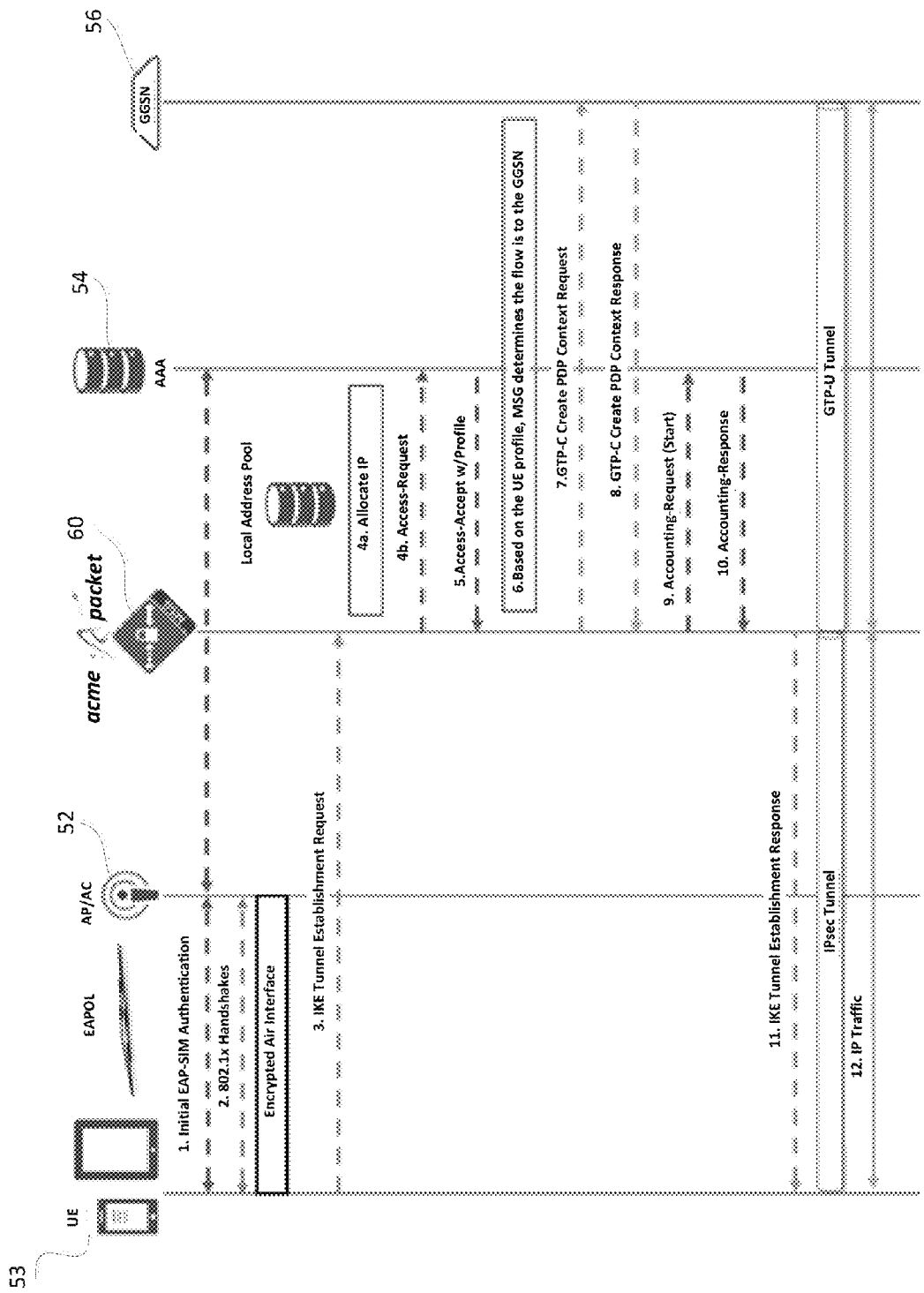
FIG. 8 is an IKE-based message flow setup when interworking with a GGSN in accordance with one embodiment.

FIG. 8 is an IKE-based message flow setup when interworking with a GGSN in accordance with one embodiment. The message flow is as follows:

1. UE 53 connects to AP 52 over Wi-Fi, and uses EAP-SIM authentication to authenticate with AAA server 54.
2. The 802.1x connection setup completes, and UE 53 is now connected.
3. UE 53 attempts to establish an IPsec tunnel to SG 60 using IKE.
4. During IKE negotiation:
   a. If SG 60 is responsible for allocating the UE inner IP, an address is allocated from a local address pool.
   b. SG 60 triggers an Access-Request to AAA server 54 in order to authenticate the user and/or obtain an IP address and GPRS profile (see Table 2 above).
5. AAA server 54 responds with an Access-Accept, and includes the GPRS profile information, and IP address if allocated (see Table 3 above).
6. SG 60 receives the Access-Accept, and based on the profile information, determines the flow is to GGSN 56.

7. SG 60 initiates the GTP tunnel setup with GGSN 56 by sending a Create-PDP-Context Request to GGSN 56 (see Table 6 above).

8. GGSN 56 responds with a Create-PDP-Context Response.

9. SG 60 sends an Accounting-Request (Start) to AAA server 54 (see Table 7 above).

10. AAA server 54 responds with an Accounting-Response, acknowledging the request.

11. SG 60 completes IKE negotiation with the client, and returns the IP address that was allocated for UE 53. The GTP-U tunnel is now established. SG 60 programs the flows between the GTP-U tunnel and the IPsec tunnel.

12. Data flows over the IPsec tunnel between UE 53 and SG 60, and is routed to and from GGSN 56.

In another embodiment, an IKE-based message flow setup is performed with a default gateway, such as default gateway 57, instead of interworking with a GGSN as in FIG. 8. In this embodiment, the message flow is identical to FIG. 8 except flows 7 and 8 are removed. Instead of establishing a connection with GGSN 56, SG 60 determines that the flow is to a default gateway, and programs the data flow accordingly.

Figure 9:
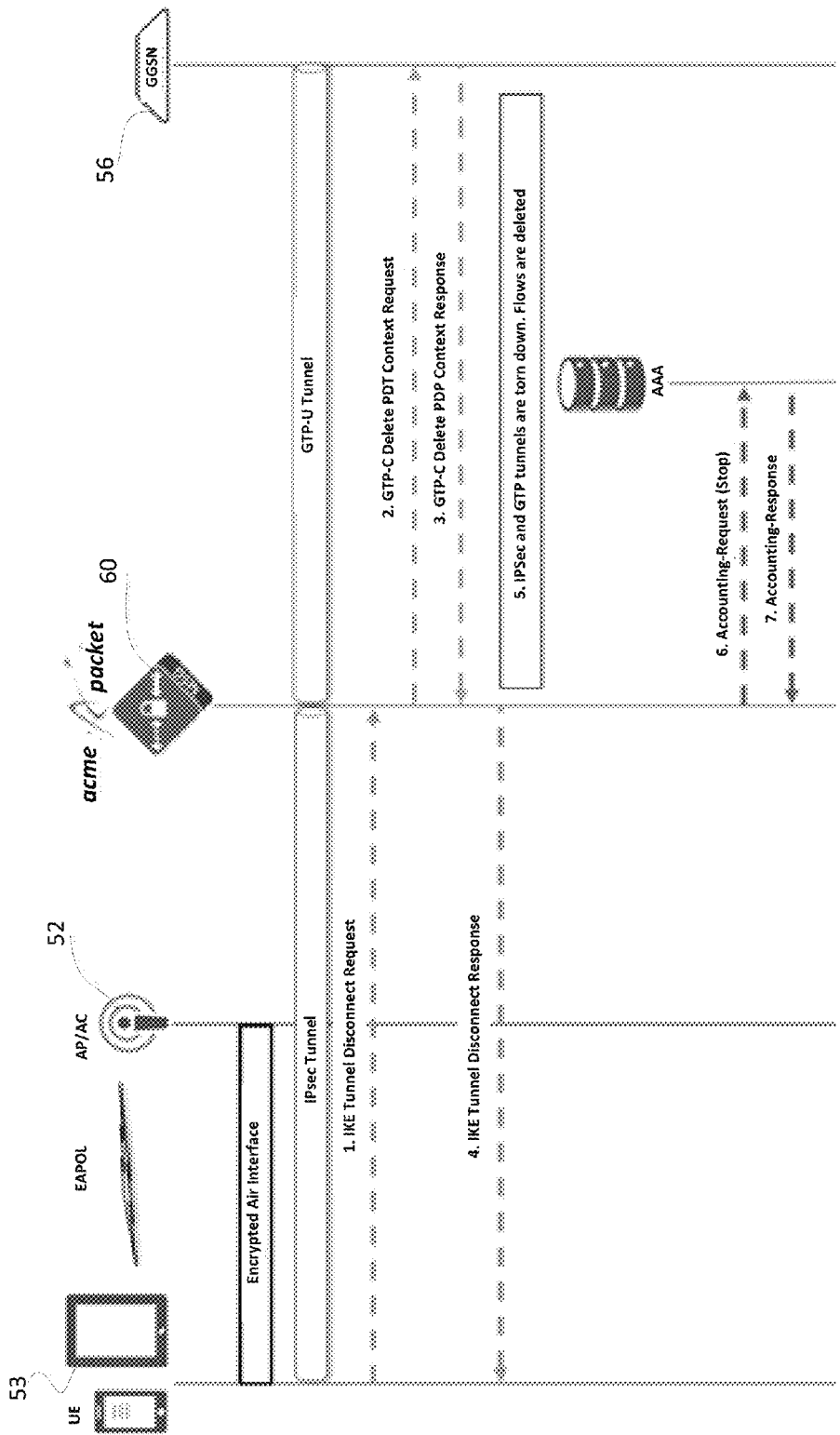
FIG. 9 is an IKE-based message flow teardown when interworking with a GGSN that is IKE initiated in accordance with one embodiment.

FIG. 9 is an IKE-based message flow teardown when interworking with a GGSN that is IKE initiated in accordance with one embodiment. The message flow is as follows:

1. UE 53 initiates tunnel teardown with SG 60 over IKE.
2. SG 60 initiates GTP tunnel teardown by sending a Delete-PDP-Context request to GGSN 56.
3. GGSN 56 responds back with a Delete-PDP-Context response.
4. SG 60 completes the IKE teardown procedure with the client.
5. SG 60 removes all flow information for GTP and IPsec, and cleans up any active contexts.
6. SG 60 sends a Radius Accounting-Request (Stop) to AAA server 54 (see Table 8 above).
7. AAA server 54 will release the IP address if allocated, and collect any accounting information. AAA server 54 then sends an Accounting-Response (Stop) back to SG 60.

In another embodiment, an IKE-based message flow teardown that is IKE initiated is performed with a default gateway, such as default gateway 57, instead of interworking with a GGSN as in FIG. 9. In this embodiment, the message flow is identical to FIG. 9 except flows 2 and 3 are removed.

Figure 10:
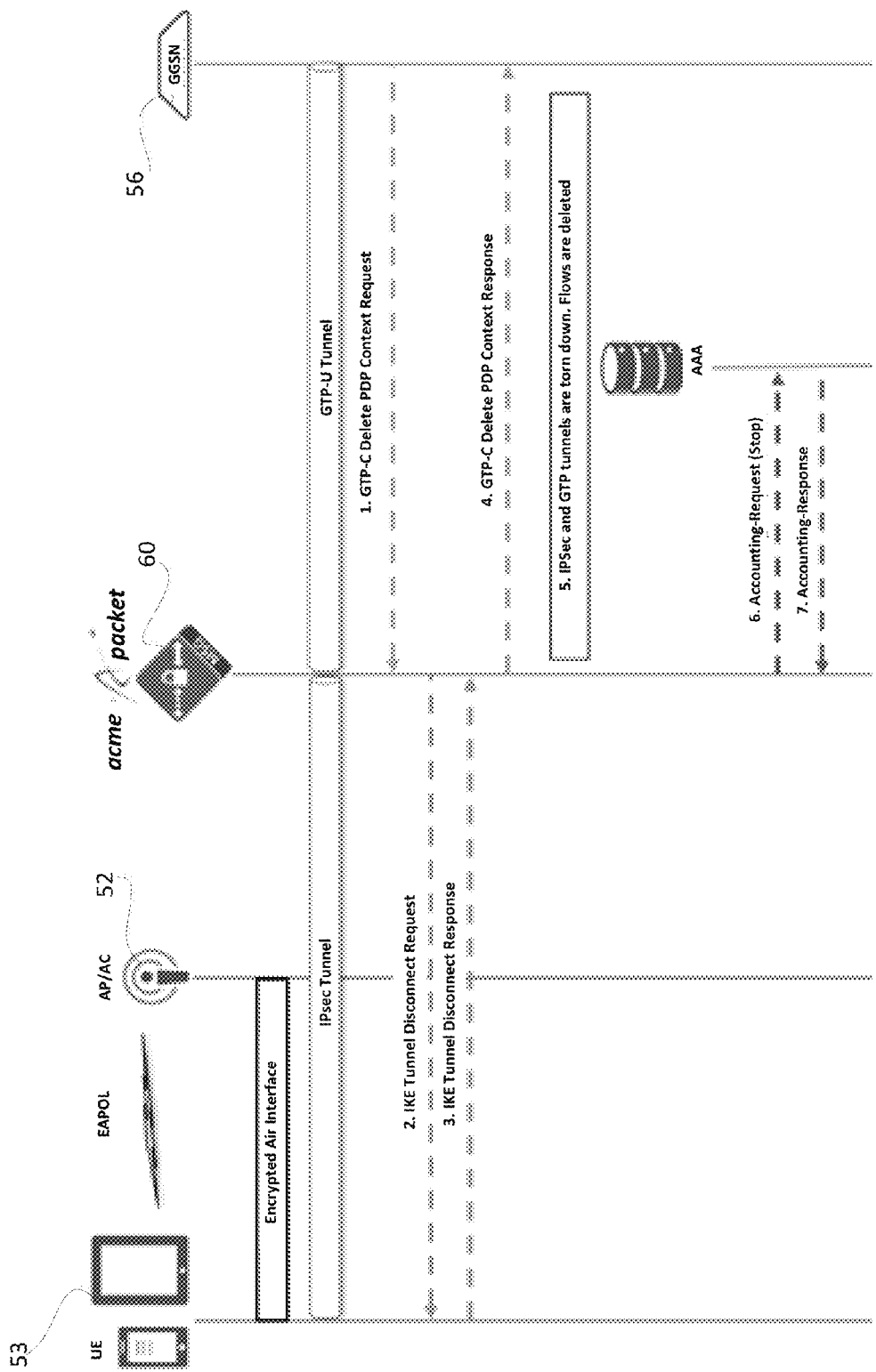
FIG. 10 is an IKE-based message flow teardown when interworking with a GGSN that is GGSN initiated in accordance with one embodiment.

FIG. 10 is an IKE-based message flow teardown when interworking with a GGSN that is GGSN initiated in accordance with one embodiment. The message flow is as follows:

1. GGSN 56 initiates GTP tunnel teardown by sending a Delete-PDP-Context request to SG 60.
2. SG 60 initiates IPsec tunnel teardown with UE 53 over IKE.
3. UE 53 responds back to SG 60 and completes the teardown procedure.
4. SG 60 responds back to GGSN 56 with a Delete-PDP-Context response.
5. SG 60 removes all flow information for GTP and IPsec, and cleans up any active contexts.
6. SG 60 sends a Radius Accounting-Request (Stop) to AAA server 54 (see Table 8 above).
7. AAA server 54 will release the IP address if allocated, and collect any accounting information. AAA server 54 then sends an Accounting-Response (Stop) back to SG 60.

Embodiments shown in FIGS. 11-14 below are based on ePDG functionality as defined in 3GPP TS 23.402 V11.4.0 Release 11, "Architecture enhancements for non-3GPP accesses", the disclosure of which is hereby incorporated by reference. FIGS. 11-14 include a packet data network ("PDN") gateway ("GW"), and a Home Subscriber Service ("HSS") which manages the user database for AAA services. FIGS. 11-14 further include a Policy and Charging Rules Function ("PCRF") for policy control and charging rules. When roaming is involved, the PCRF is referred to as the "hPCRF" in the home network, and "vPCRF" in the visiting network.

Figure 11:
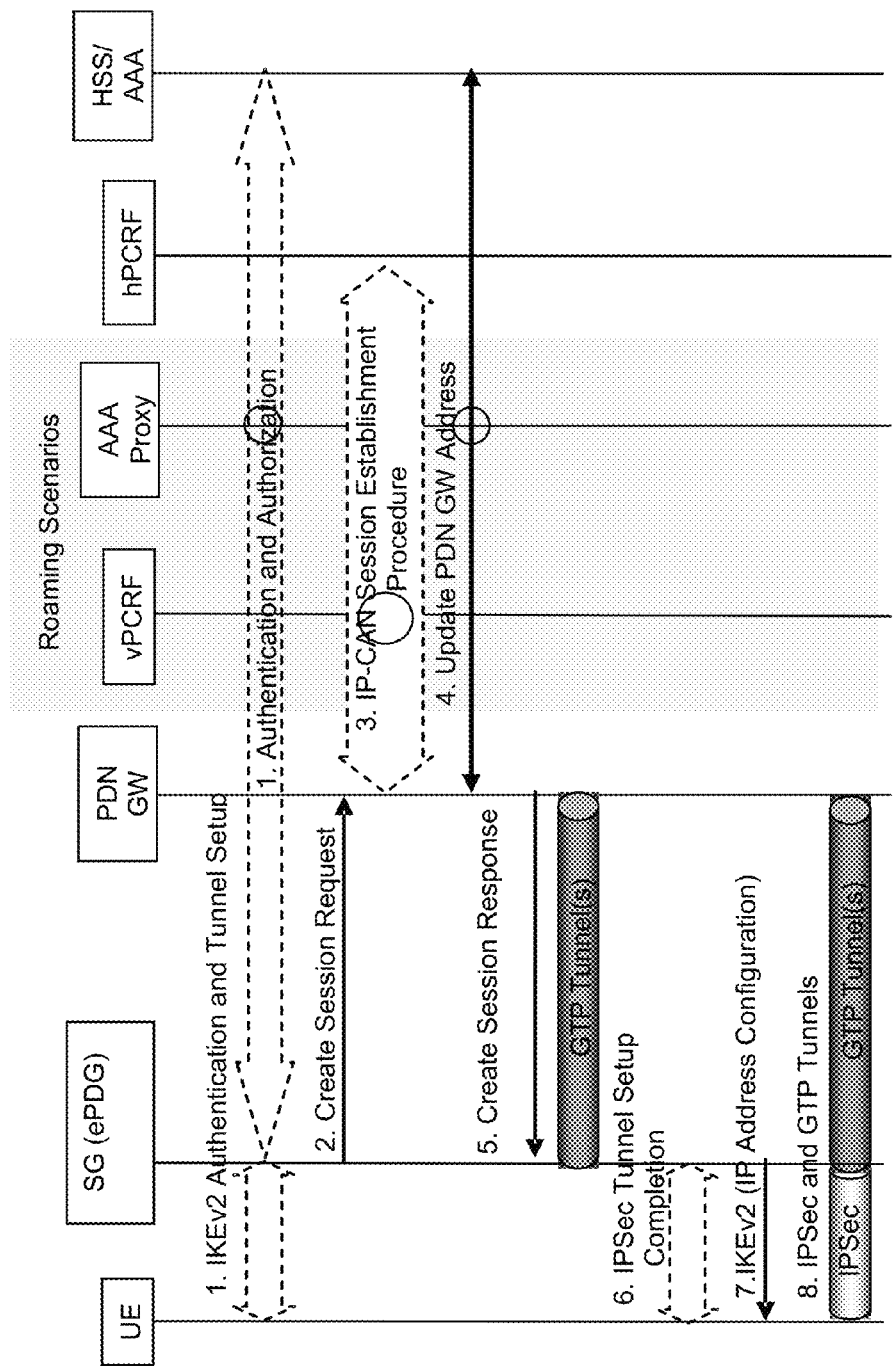
FIG. 11 is an ePDG based message flow for Initial Attach with GTP on S2b in accordance with one embodiment.
Figure 12:
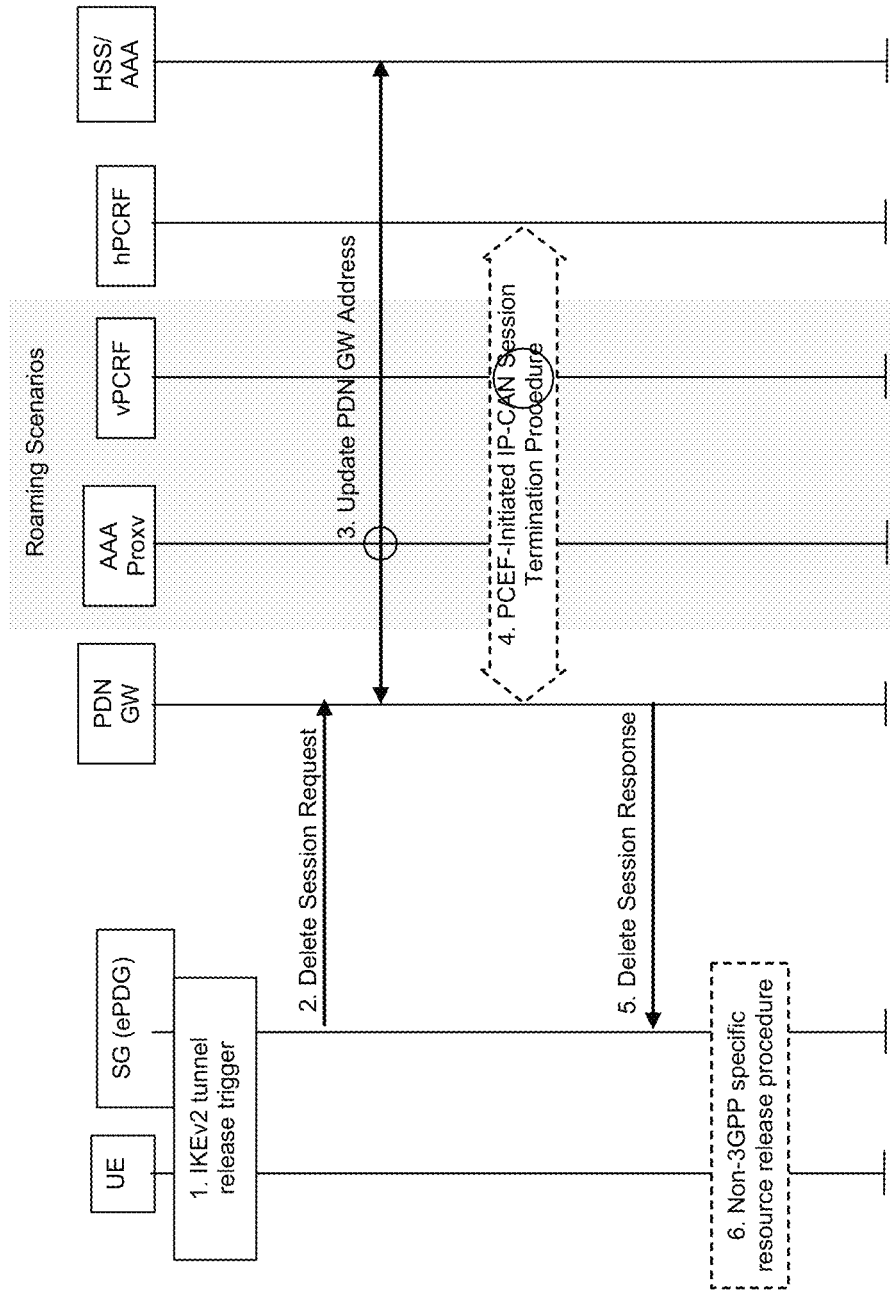
FIG. 12 is an ePDG based message flow for Detach and PDN Disconnection with GTP on S2b in accordance with one embodiment.

FIG. 11 is an ePDG based message flow for Initial Attach with GTP on S2b in accordance with one embodiment. FIG. 12 is an ePDG based message flow for Detach and PDN Disconnection with GTP on S2b in accordance with one embodiment. S2b is the interface connection between ePDG and the PDN gateway.

Figure 13:
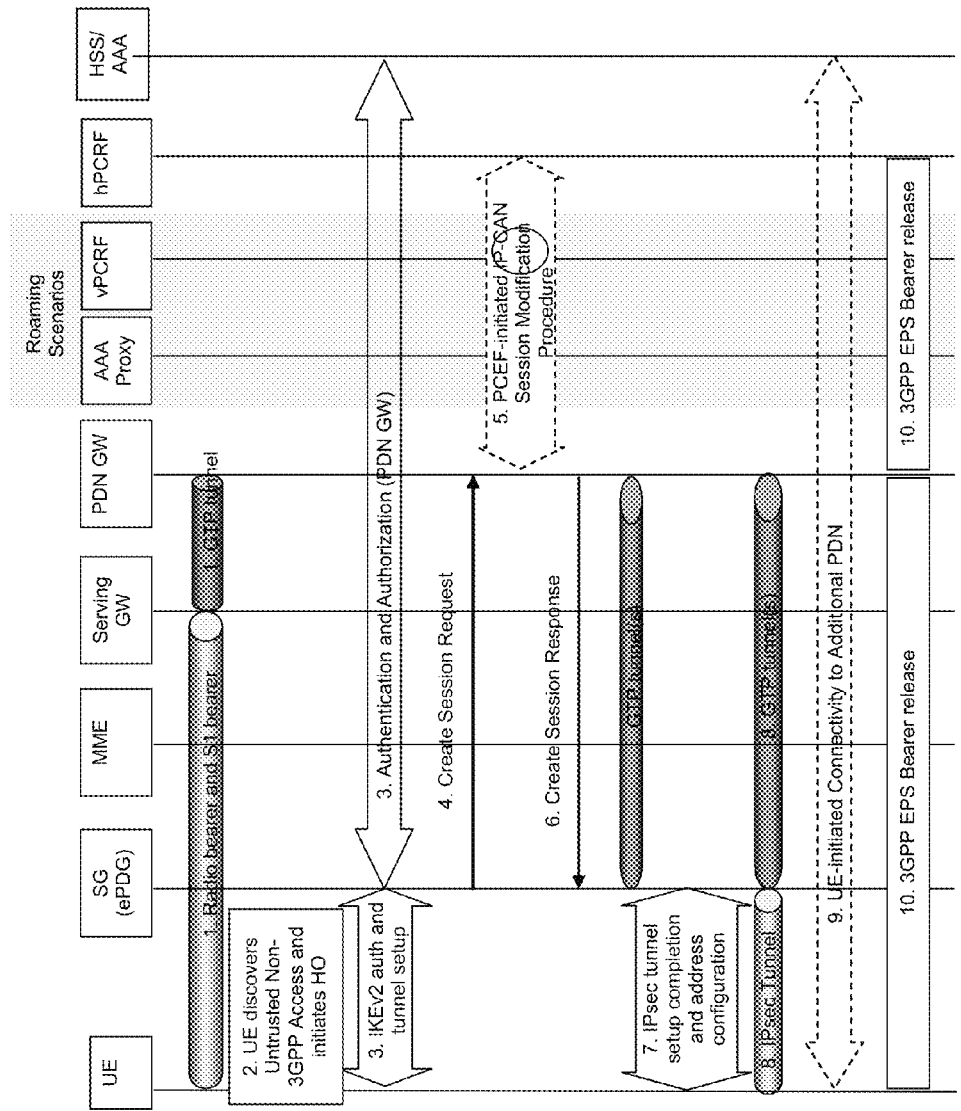
FIG. 13 is an ePDG based message flow for handover from 3GPP access (4G/3G) to untrusted Wi-Fi in accordance with one embodiment.

FIG. 13 is an ePDG based message flow for handover from 3GPP access (4G/3G) to untrusted Wi-Fi in accordance with one embodiment. FIG. 13 includes a Mobility Management Entity ("MME") which handles the signaling (control plane) related to mobility and security for the E-UTRAN access (LTE access).

1. UE 53 acquires LTE access to the core network.
2. UE 53 initiates the handover procedure and performs the mutual authentication towards the ePDG by using the IKEv2/EAP-AKA.
3. UE 53 is authenticated via a 3GPP AAA server 54.
4. UE 53 requests an IP address in the IKEv2 message exchange. The ePDG creates and sends the "Create Session Request" message containing the IMSI, MSISDN and other parameters to the PDN GW.
6. The PDN GW sends the "Create Session Response" back; this contains the IP address to be assigned to UE 53 (the same IP as was being used by UE on the Radio access network ("RAN")).
7. The ePDG will return the IP address to the UE using the IKEv2 message exchange. The IPSec and the GTP tunnels are established for the data traffic.

Figure 14:
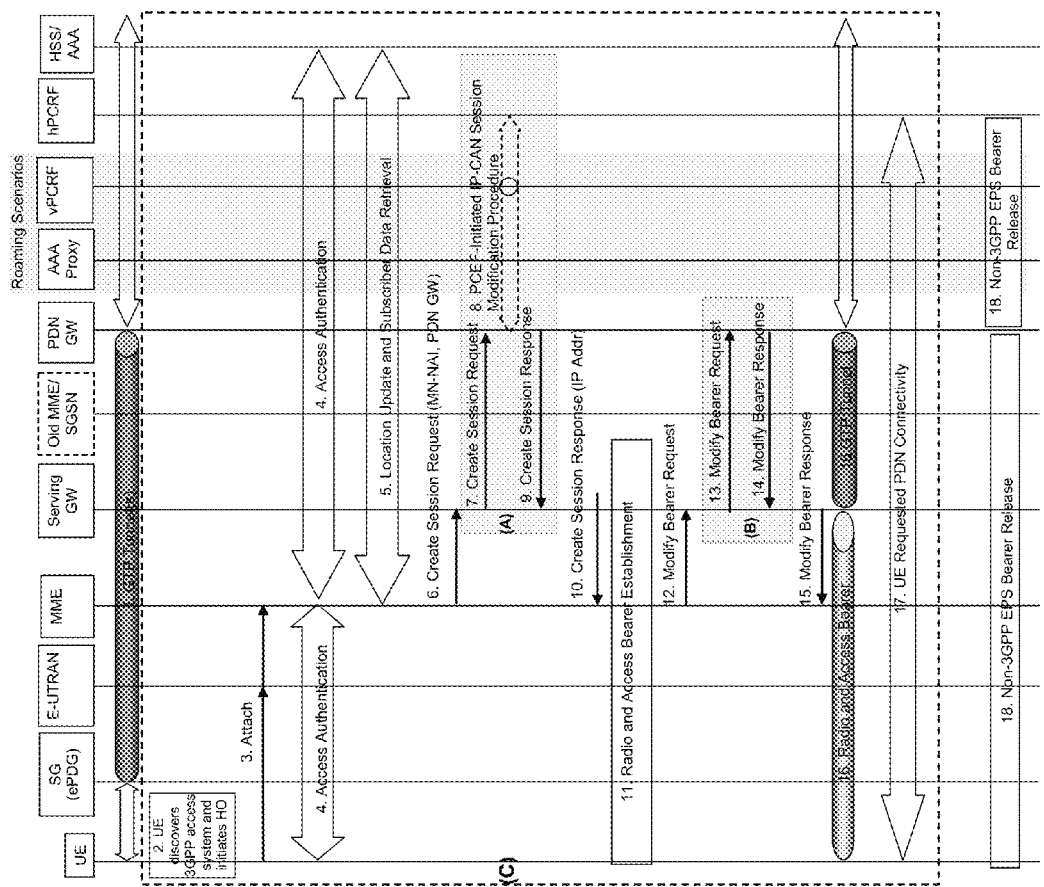
FIG. 14 is an ePDG based message flow for Handover from Wi-Fi access to 3GPP access (3G/4G) in accordance with one embodiment.

FIG. 14 is an ePDG based message flow for Handover from Wi-Fi access to 3GPP access (3G/4G) in accordance with one embodiment.

Figure 15:
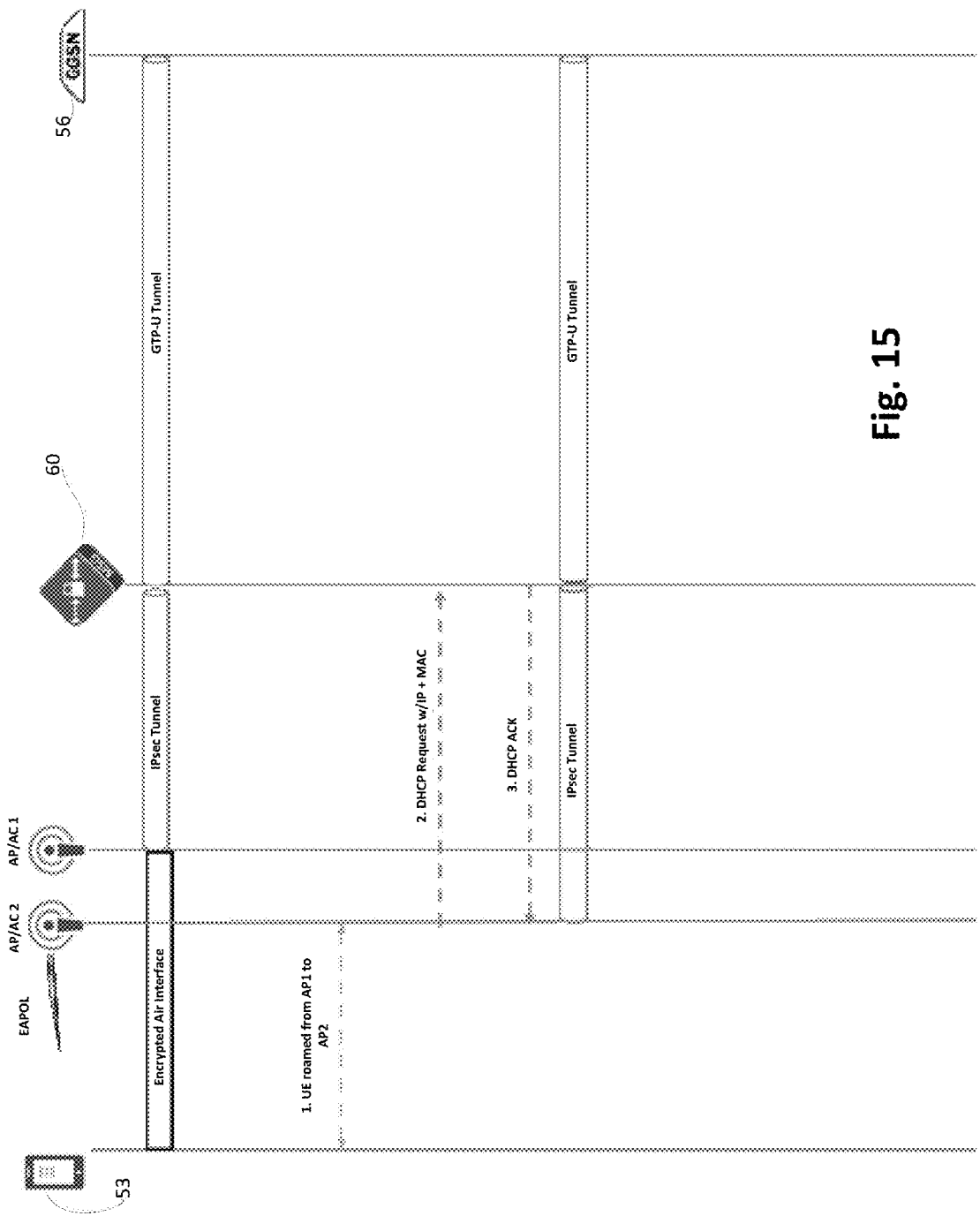
FIG. 15 is message flow for AP to AP roaming in accordance with one embodiment.

FIG. 15 is message flow for AP to AP roaming in accordance with one embodiment. The message flow for FIG. 15 is as follows:

1. In case UE 53 roams from AP1 to AP2, SG 60 will get a DHCP request message from AP2 (once it detects that UE 53 has roamed from AP1) with the IP/MAC of UE 53. Once received, SG 60 will know that the UE is now connected to AP2 and the internal tables of SG 60 are updated.
2. The DHCP ACK is sent back to the AP2.
3. SG 60 will be able to reuse the GTP tunnel on the core side.

Wi-Fi Offload Accounting Support

Embodiments provide accounting support for Wi-Fi offload solutions, such as the solution shown in FIG. 3. This feature enables SG 60 to collect statistics about offloaded data per UE session and send the collected information to external RADIUS and Diameter AAA servers residing in the network.

The Radius accounting start request will be generated from SG 60 per UE 53 to AAA server 54 for the following events:

1. After MSG gets a GTP-C Create PDP Context Response from GGSN 56;

2. In the case of "Routing to Gateway" call flow (as per FIG. 4 above), after SG 60 gets a DHCP request with IP-FMAC; or
3. In the case of "IKE initiated flow to Gateway" call flow (as per FIG. 8 above with default gateway), after SG 60 gets an Access-Accept from AAA server 54.

The start request will contain the attributes disclosed in Table 9 below.

The Radius accounting stop request will be generated from SG 60 per UE 53 to AAA server 54 for the following events:

1. Once SG 60 gets a GTP-C Delete PDP Context Response from GGSN 56 (as per FIG. 5 above);
2. If GGSN 56 is not involved in the call flow, once SG 60 receives a Disconnect-Request with UE MAC from AAA server 54 (as per FIG. 5 above with default gateway);
3. If GGSN 56 is not involved in the call flow, once SG 60 gets a DHCP release or lease timeout (as per FIG. 6 above with default gateway);
4. If GGSN 56 initiated the tunnel teardown, after SG 60 sends a GTP-C Delete PDP Context Response (as per FIG. 7 above);
5. In case of "IKE initiated tear-down" call flow without GGSN, after SG 60 sends a IKE tunnel disconnect response (as per FIG. 9 above with default gateway); or
6. Any unexpected error happened in the system after Accounting start record is sent.

The start request will contain the attributes disclosed in Table 9 below.

The following table discloses the Radius attributes in accordance with one embodiment:

TABLE 9

| RADIUS Attributes | Description | Radius Attribute Type | Radius Attribute Value | Accounting Messages | Notes |
|---|---|---|---|---|---|
| Acct-Status-Type | Indicates the beginning (start), interim, stop of the tunnel session | 40 | 1 (start) 2 (stop) 3 (interim-update) | Start, Interim-Update, Stop | |
| Class | This value coming in Access-Accept response from the server is copied in Accounting requests sent from NAS. | 25 | Application-specific value | Start, Interim-Update, Stop | |
| Acme-Event-Time | Indicates the time the event (tunnel establishment/tear down/periodic interim) has occurred. | 55 | String containing time in GMT | Start, Interim-Update, Stop | This attribute can be used to contain "Record Opening Time" information mentioned in CRD |
| Calling-Station-Id | The MSISDN of the UE | 31/66 | String containing MSISDN number | Start, Interim-Update, Stop | The MSISDN, taken from Chargeable-User-Identity of Access-Accept |
| Framed-IP-Address | IP address allocated for the UE | 8 | Address | Start, Interim-Update, Stop | Inner IP assigned from either local-address-pool or AAA server. This attribute contains the value of UE-IP-Address attribute |
| User-Name | MAC address of the UE | 1 | String consisting of MAC | Start, Interim-Update, Stop | |
| Acct-Session-ID | Indicates a unique Accounting ID | 44 | | Start, Interim-Update, Stop, On, Off | |
| NAS IP-Address | Wancom0's IP address | 4 | | Start, Interim-Update, Stop, On, Off | IP address of the access server (MSG) |
| NAS Port | Ephemeral port to which external accounting socket is bound to | 5 | | Start, Interim-Update, Stop, On, Off | |
| NAS Identifier | Value configured by the user in account-server configuration | 32 | | Start, Interim-Update, Stop, On, Off | |
| Acct-Terminate-Cause | Reason for tunnel tear-down (UE-initiated, GGSN initiated, DHCP initiated, system error) | 49 | 1-UE requested 19 - GGSN initiated 5 - Session Timeout (DHCP initiated) | Stop | |

TABLE 9-continued

| RADIUS Attributes | Description | Radius Attribute Type | Radius Attribute Value | Accounting Messages | Notes |
|---|---|---|---|---|---|
| | | | 9 - NAS error (System error) | | |
| Acct-Session-Time | Length/Duration of the UE session | 46 | | Interim-Update, Stop | |
| Acct-In-Packets | # packets in to the UE | 47 | | Interim-Update, Stop | |
| Acct-Output-Packets | # packets out of the UE | 48 | | Interim-Update, Stop | |
| Acct-Input-Octets | # bytes in to the UE | 42 | | Interim-Update, Stop | |
| Acct-Output-Octets | # bytes out of the UE | 43 | | Interim-Update, Stop | |
| Acct-Input-Gigawords | Number of times the Acct-Input-Octets counter has wrapped around $2^{32}$ over the course of the session | 52 | | Interim-update, Stop | |
| Acct-Output-Gigawords | Number of times the Acct-Input-Octets counter has wrapped around $2^{32}$ over the course of the session | 53 | | Interim-update, Stop | |
| 3GPP-IMSI | IMSI of the user | 1 | String | Start, Interim-Update, Stop | 3GPP TS 29.06, section 16.4.7.1 |
| 3GPP-GGSN-Address | IP of the GGSN server used by the GTP-C for the context establishment | 7 | Address | Start, Interim-Update, Stop | 3GPP TS 29.06, section 16.4.7.1 Sent only if GGSN is present in the call flow |
| 3GPP-WLAN-APN-Id | The W-APN from which the user receives service from | 100 | String | Start, Interim-Update, Stop | Using the same attribute type of Diameter as there is no corresponding radius attribute |
| 3GPP-PDP-IP-Address | IP address of the UE related to a particular PDP context | 1227 | Address | Start, Interim-Update, Stop | Using the same attribute type of Diameter as there is no corresponding radius attribute. Sent only if GGSN is present in the call flow. This should be same as Framed-IP-address |
| 3GPP-RAT-Type | Indicates which RAT is currently serving the UE | 21 | Integer (set to WLAN - 3) | Start, Interim-Update, Stop | 3GPP TS 29.06, section 16.4.7.1 |

For the Diameter start record, the format of an Accounting-Request ("ACR") message that SG 60 will send to AAA server 54 in one embodiment is as follows:

```
<ACR> ::= < Diameter Header: 271, REQ >
          { Session-Id }
          { Origin-Host }
          { Origin-Realm }
          { Destination-Realm }
          { Destination-Host }
          { Accounting-Record-Type }
          { Accounting-Record-Number }
          [ Acct-Application-Id ]
          [ User-Name ]
          [ Event-Timestamp ]
          [ Framed-IP-Address ]
          [ Calling-Station-Id ]
          [3GPP-IMSI]
          [3GPP-GGSN-Address]
          [3GPP-WLAN-APN-Id]
          [3GPP-PDP-IP-Address]
          [3GPP-RAT-Type]
```

The ACR AVPs:

Session-Id AVP (263)—will be used to uniquely identify this session.

Origin-Host AVP (264)—will be populated from the hostname field in the account-config data object and the origin-realm field and the domain-name-suffix field in the account-server sub-object for which server the request is destined to.

Origin-Realm AVP (296)—will be populated from the origin-realm field and the domain-name-suffix field in the account-server sub-object for which server the request is destined to.

Destination-Realm AVP (283)—will be populated by the value of the Origin-Realm AVP in the CEA received from the server for this connection.

Destination-Host AVP (293)—will be populated by the value of the Origin-Host AVP in the CEA received from the server for this connection.

Accounting-Record-Type AVP (480)—will be populated by the appropriate value for what type of accounting message is being sent, for START records the value is 2.

Accounting-Record-Number AVP (485)—This is a value that uniquely identifies this message in the session. It amounts to a sequence number for this connection.

Acct-Application-Id AVP (259)—will be set to the value of 3, this the value the base RFC calls for in Diameter based accounting messages.

User-Name AVP (1)—is of type string and contains the MAC address of the UE.

Event-Timestamp AVP (55)—This is the time in seconds that indicates the time when the GTP tunnel is established.

Framed-IP-Address AVP (8)—contains the IP address allocated for the UE.

Calling-Station-Id AVP (31)—This contains the MSISDN of the UE.

3GPP-IMSI AVP (1)—This contains the IMSI of the UE.

3GPP-GGSN-Address AVP (847)—This contains the IP address of the GGSN server.

3GPP-WLAN-APN-Id AVP (100)—This contains the W-APN Id from which the user receives service from.

3GPP-PDP-IP-Address AVP (1227)—This contains the IP address of the UE related to a particular PDP context.

3GPP-RAT-Type AVP (21)—This contains the RAT that is currently serving the UE.

For the Diameter stop record, the format of ACR message that SG 60 will send to AAA server 54 in one embodiment is as follows:

```
<ACR> ::= < Diameter Header: 271, REQ >
    { Session-Id }
    { Origin-Host }
    { Origin-Realm }
    { Destination-Realm }
    { Destination-Host }
    { Accounting-Record-Type }
    { Accounting-Record-Number }
    [ Acct-Application-Id ]
    [ User-Name ]
    [ Event-Timestamp ]
    [ Termination-Cause ]
    [ Acct-Session-Time ]
    [ Framed-IP-Address ]
    [ Calling-Station-Id ]
    [ Accounting-Input-Octets ]
    [ Accounting-Output-Octets ]
    [ Accounting-Input-Packets ]
    [ Accounting-Output-Packets ]
    [3GPP-IMSI]
    [3GPP-GGSN-Address]
    [3GPP-WLAN-APN-Id]
    [3GPP-UE-IP-Address]
    [3GPP-PDP-IP-Address]
    [3GPP-RAT-Type]
```

The ACR AVPs:

Acct-Session-Time AVP (46)—contains the length of the tunnel lifetime in seconds. It can only be present in ACR messages for Interim Record or Stop Record.

Accounting-Input-Octets AVP (363)—contains the number of octets into the UE.

Accounting-Output-Octets AVP (364)—contains the number of octets out of the UE.

Accounting-Input-Packets (365)—contains the number of packets into the UE.

Accounting-Output-Packets (366)—contains the number of IP packets out of the UE.

The new 3GPP attributes description is the same as disclosed above for the Start record.

DHCP IP Address Assignment for Endpoints

In connection with the message flow disclosed in conjunction with FIG. 3 above, SG 60 will mimic the functionality of a DHCP server in order to assign UE IP addresses in one embodiment. In one embodiment, the IP address assignment is as follows:

In flows 2 and 3 of FIG. 3, UE 53 connects to AP 52 over 802.1x, and is initially authenticated using EAP-SIM between AP 52 and AAA server 54.

Once UE 53 is connected to AP 52, it will send a DHCPDISCOVER broadcast message in order to obtain an IP address, as shown in flow 4 of FIG. 3.

AP 52 will be responsible for relaying the DHCP requests between UE 53 and SG 60. The connection between AP 52 and SG 60 may be secured with a single IPsec tunnel per AP/SSID. In this case, the DHCP messages will be relayed over the IPsec tunnel, as shown in flow 5 of FIG. 3.

When SG 60 receives the DHCPDISCOVER request, it will first determine who is responsible for assigning the IP address. The method for IP address assignment will be configurable. The addresses may be assigned through a local address pool in the same fashion as already implemented for IKE local address pools, or AAA server 54 can be responsible for assigning the IP address.

If SG 60 is allocating the IP addresses, the address will be allocated prior to the AAA exchange, otherwise AAA server 54 will return the allocated IP address. SG 60 converts the DHCPDISCOVER into an Access-Request message, as shown in flow 6b of FIG. 3.

AAA server 54 receives the Access-Request message, and associates the UE MAC with the UE that already authenticated with AP 52 using EAP-SIM. If AAA server 54 is responsible for allocating the UE IP Address, it will assign an IP which will be returned in the response. AAA server 54 will also query the GPRS profile information for the user, and return those parameters in the Access-Accept message sent to SG, as shown in flow 7 of FIG. 3.

SG 60 receives the Access-Accept response from AAA server 54, and converts it into a DHCPOFFER request that is sent towards UE 53. The offer includes the IP address that was allocated for UE 53, as shown in flow 8 of FIG. 3.

The DHCPOFFER will be forwarded back to UE 53, and UE 53 will determine if it wishes to accept the offer. If so, it will send a DHCPREQUEST message, requesting the IP address that was in the offer message, as shown in flows 9-11 of FIG. 3.

SG 60 receives the DHCPREQUEST message, and validates it against the offer. If the request is invalid, such as an invalid IP address, SG 60 responds with a DHCPNAK and the transaction terminates.

Depending on the UE profile information received from AAA server 54, along with local configuration, SG 60 may contact GGSN 56 to establish a GTP tunnel for UE 53, as disclosed above. When contacting GGSN 56, a "remote" inner IP address may be assigned by GGSN 56. In this case, the UE's IP address will be replaced by this GGSN assigned "inner IP" for the user traffic (GTP data channel) between SG 60 and GGSN 56.

SG 60 may start accounting at this point, as disclosed above.

If all flows installed correctly and any GTP tunnels are set up, a DHCPACK message is sent back to the client, and the client is free to send and receive data traffic.

Figure 16:
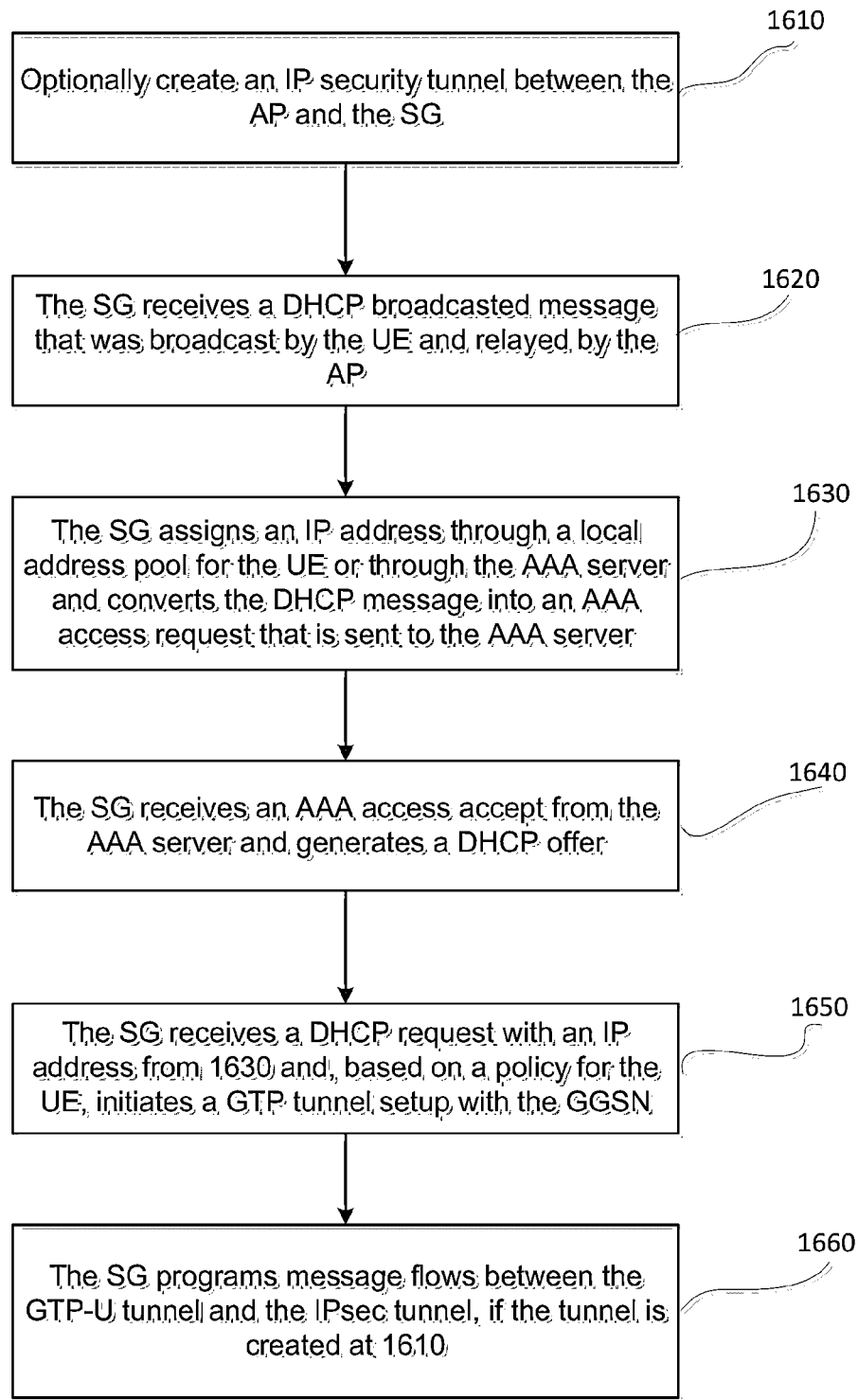
FIG. 16 is a flow diagram of the functionality of a Wi-Fi offload module of FIG. 2 when performing Wi-Fi offload in accordance with embodiments of the present invention.

FIG. 16 is a flow diagram of the functionality of Wi-Fi offload module 16 of FIG. 2 when performing Wi-Fi offload in accordance with embodiments of the present invention. In one embodiment, the functionality of the flow diagram of FIG. 16 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In general, the functionality of FIG. 16 is implemented by SG 60 of FIG. 1, while interacting with other network elements of FIG. 1.

At 1610, an IP security tunnel is optionally created between AP 52 and SG 60.

At 1620, SG 60 receives a DHCP broadcasted message that was broadcast by UE 53 and relayed by AP 52.

At 1630, SG 60 assigns an IP address through a local address pool for UE 53, or through AAA server 54, and converts the DHCP message into an AAA access request that is sent to AAA server 54.

At 1640, SG 60 receives an AAA access accept from AAA server 54 and generates a DHCP offer.

At 1650, SG 60 receives a DHCP request with an IP address from 1630 and, based on a policy for UE 53, initiates a GTP tunnel setup with GGSN 56.

At 1660, SG 60 programs message flows between the GTP-U tunnel and the IPsec tunnel, if the tunnel is created at 1610.

As disclosed, embodiments provide Wi-Fi offload functionality for cellular data. Embodiments include a DHCP proxy to process DHCP requests from mobile devices (i.e., UEs) and interact with policy servers (i.e., AAA servers) to authorize UE access and get proper access parameters (e.g., APN, IP, SUBNET MASK, DNS, etc.). Embodiments can assign IP addresses from a local address pool or from the policy server on the UE side (for traffic between the UE and the SG) and optionally, the GGSN can assign an IP address for the UE for traffic between the SG and the GGSN.

Embodiments further include an SG routing agent that can set up the routing decision based on routing policies configured and the parameters from the UE and the policy server. Further, a GTP agent interacts with a DHCP agent to set up GTP tunnel with provisioned GGSN gateway if GTP routing is selected.

In embodiments, once a GTP server is selected and a GTP tunnel is established, GTP traffic flows (inbound and outbound) are created on a dedicated hardware platform to handle GTP tunnel traffic in real-time to support high throughput. Further, an accounting agent creates various accounting records to accounting servers (e.g., AAA or diameter).

Embodiments further support high availability ("HA") with HA setup and protects real time traffic from switchovers. All UE's profiles, SG routing decisions, GTP tunnels on hardware, etc. are synchronized to a standby system in real time to guarantee no traffic interruption. Embodiments support IKEv2 and IPsec protection if configured between an AP/Wi-Fi hot-spot and a security gateway access interface. Finally, if a UE can get an IP address from an AP, embodiments support IKEv2/IPSEC between a UE and a security gateway access interface (LTE mode).

Therefore, as disclosed, embodiments provide flexible IP address management, flexible routing, optional IPSec protection, high performance, unique 1:1 redundancy and accounting support.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to offload cellular data from a user equipment (UE), the offloading comprising:

after the UE is connected to a Wi-Fi access point (AP), receiving at a gateway server a dynamic host configuration protocol (DHCP) message from the AP, wherein the DHCP message comprises a media access control address of the UE;

converting the DHCP message into an authentication, authorization and accounting (AAA) access request and sending the MA access request from a DHCP server to an AAA server, wherein the AAA server is a separate server from the DHCP server and is located within a cellular network and authenticates the UE;

receiving an AAA access accept from the AAA server, wherein the access accept comprises an Internet Protocol (IP) address;

associating the IP address with the UE;

initiating a gateway general packet radio service (GPRS) tunneling protocol (GTP) tunnel setup with a GPRS setup node (GGSN);

creating an Internet Protocol (IP) security (IPsec) tunnel to the AP; and wherein the offloaded cellular data is sent directly to the Internet and bypasses the GGSN.

2. The non-transitory computer-readable medium of claim 1, the offloading further comprising:

collecting statistics about offloaded data and sending the collected statistics to the AAA server.

3. The non-transitory computer-readable medium of claim 1, wherein the AAA server associates the a media access control address with the UE.

4. The non-transitory computer-readable medium of claim 1, wherein the AAA server associates the media access control address with the UE.

5. The non-transitory computer-readable medium of claim 1, wherein the AAA server functions in accordance to a Remote Authentication Dial In User Service (Radius) protocol specification or a Diameter protocol specification, and the cellular network is in accordance with a 3rd Generation Partnership Project (3GPP).

6. The non-transitory computer-readable medium of claim 1, the offloading further comprising a high availability setup for the processor.

7. A method of offloading cellular data from a user equipment (UE), the method comprising:

after the UE is connected to a Wi-Fi access point (AP), receiving at a gateway server a dynamic host configuration protocol (DHCP) message from the AP, wherein the DHCP message comprises a media access control address of the UE;

converting the DHCP message into an authentication, authorization and accounting (AAA) access request from a DHCP server and sending the AAA access request to an AAA server, wherein the AAA server is a separate server from the DHCP server and is located within a cellular network and authenticates the UE;

receiving an AAA access accept from the AAA server, wherein the access accept comprises an Internet Protocol (IP) address;

associating the IP address with the UE;

initiating a gateway general packet radio service (GPRS) tunneling protocol (GTP) tunnel setup with a GPRS setup node (GGSN);

creating an Internet Protocol (IP) security (IPsec) tunnel to the AP; and wherein the offloaded cellular data is sent directly to the Internet and bypasses the GGSN.

8. The method of claim 7, further comprising: collecting statistics about offloaded data and sending the collected statistics to the AAA server.

9. The method of claim 8, further comprising replacing the IP address with a GGSN assigned IP address.

10. The method of claim 7, wherein the AAA server associates the a media access control address with the UE.

11. The method of claim 7, wherein the AAA server functions in accordance to a Remote Authentication Dial In User Service (Radius) protocol specification or a Diameter protocol specification and the cellular network is in accordance with a 3rd Generation Partnership Project (3GPP).

12. The method of claim 7, the offloading further comprising programming message flows between the IPsec tunnel and the GTP tunnel.

13. The method of claim 7, the offloading further comprising a high availability setup for a processor that implements the offloading.

14. A security gateway system coupled to a Wi-Fi access point (AP), the system comprising: a processor; a storage device coupled to the processor storing a Wi-Fi offload module that, when executed by the processor, offloads cellular data from a user equipment (UE) in communication with the AP, the offloading comprising:

after the UE is connected to a Wi-Fi access point (AP), receiving at a gateway server a dynamic host configuration protocol (DHCP) message from the AP, wherein the DHCP message comprises a media access control address of the UE;

converting the DHCP message into an authentication, authorization and accounting (AAA) access request and sending the AAA access request from a DHCP server to an AAA server, wherein the AAA server is a separate server from the DHCP server and is located within a cellular network and authenticates the UE;

receiving an AAA access accept from the AAA server, wherein the access accept comprises an Internet Protocol (IP) address;

associating the IP address with the UE;

initiating a gateway general packet radio service (GPRS) tunneling protocol (GTP) tunnel setup with a GPRS setup node (GGSN);

creating an Internet Protocol (IP) security (IPsec) tunnel to the AP; and wherein the offloaded cellular data is sent directly to the Internet and bypasses the GGSN.

15. The security gateway system of claim 14, the offloading further comprising:
collecting statistics about offloaded data and sending the collected statistics to the AAA server.

16. The security gateway system of claim 14, wherein the AAA server associates the media access control address with the UE.

17. The security gateway system of claim 14, the offloading further comprising a high availability setup for the processor.

18. The security gateway system of claim 14, wherein the AAA server functions in accordance to a Remote Authentication Dial In User Service (Radius) protocol specification or a Diameter protocol specification and the cellular network is in accordance with a 3rd Generation Partnership Project (3GPP).

19. The security gateway system of claim 14, the offloading further comprising programming message flows between the IPsec tunnel and the GTP tunnel.

* * * * *